United States Patent [19]
Andrei et al.

[11] Patent Number: 5,162,174
[45] Date of Patent: Nov. 10, 1992

[54] SOLID, POLYMERIC ELECTROLYTE ON POLYEPOXY BASIS

[75] Inventors: Maria Andrei, Berceto; Luca Marchese, Milan; Stefano Passerini, Rome; Arnaldo Roggero, San Donato Milanese; Bruno Scrosati, Rome, all of Italy

[73] Assignee: Eniricerche S.P.A., Milan, Italy

[21] Appl. No.: 592,811

[22] Filed: Oct. 4, 1990

[30] Foreign Application Priority Data

Oct. 6, 1989 [IT] Italy ............................... 21937 A/89

[51] Int. Cl.$^5$ ............................... H01M 6/18
[52] U.S. Cl. ........................... 429/192; 252/62.2
[58] Field of Search ............... 429/192, 193; 252/62.2

[56] References Cited

U.S. PATENT DOCUMENTS 4,970,012 11/1990 Kuroda et al. ........................ 429/192
5,064,548 11/1991 Roggero et al. ..................... 252/622

FOREIGN PATENT DOCUMENTS 8900771 1/1989 PCT Int'l Appl. .

OTHER PUBLICATIONS

Patent Abstract of Japan, No. 62-249361 "Organic Solid Electrolyte" Oct. 1987.

*Primary Examiner*—Anthony McFarlane
*Attorney, Agent, or Firm*—Shea & Gould; George P. Hoare, Jr.

[57] ABSTRACT

A solid, polymeric electrolyte is constituted by a solid solution of an ionic compound in a polyepoxide, wherein said polyepoxide is the product of copolymerization of a monoepoxide of formula:

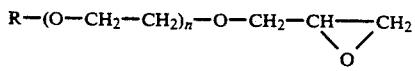

wherein:
R stands for methyl or ethyl radical; and
n is an integer comprised within the range of from 2 to 10;
with a diepoxide of formula:

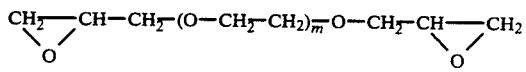

wherein:
m is an integer comprised within the range of from 2 to 10;
with a molar ratio of monoepoxide to diepoxide comprised within the range of from 99.9/0.1 to 90/10;
with said polyepoxide furthermore having a weight average molecular weight equal to, or higher than, 1,000, and a glass transition temperature (Tg) of from $-80°$ to $-60°$ C.

The solid, polymeric electrolyte can be converted into an electrochemical membrane useful in the manufacture of high-energy-density electrochemical generators, optical displays, electrochromic systems and sensors.

17 Claims, 2 Drawing Sheets

SOLID, POLYMERIC ELECTROLYTE ON POLYEPOXY BASIS

FIELD OF THE INVENTION

The present invention relates to a solid, polymeric electrolyte on polyepoxy basis, to the process for preparing it and to the use thereof.

BACKGROUND OF THE INVENTION

In the art solid, polymeric electrolytes (also said "ionic conductor polymers") are known, which are constituted by a solid solution of an ionic compound dissolved in a solid, plastic, macromolecular material, with the latter being the product of polymerization of monomers containing at least one heteroatom, in particular oxygen. Usually, said macromolecular material is polyethyleneoxide, or another polyether, such as, e.g, disclosed in U.S. Pat. No. 4,471,037; French patents 2,523,769 and 2,568,574; and in European patent 13,037.

The problems arising in connection with such solid, polymeric electrolytes generally derive from their poor mechanical characteristics, and from their low dimensional stability. Another drawback consists in that they usually only show a satisfactory ionic conductivity at temperatures higher than room temperature values. All the above drawbacks result in the solid, polymeric electrolytes known from the prior art being not very interesting for practical uses.

The purpose of the present invention is of overcoming the drawbacks which affect the prior art, as briefly mentioned above. More particularly, the present Applicant found, according to the instant finding, that the product of copolymerization of a monoepoxide and a diepoxide, selected from within particular classes of epoxy compounds, can be easily converted into solid, polymeric electrolytes and that these latter are endowed with good mechanical characteristics and good ionic conductivity also at relatively low temperature.

SUMMARY OF THE INVENTION

In accordance therewith, according to a first aspect thereof, the present invention relates to a solid, polymeric electrolyte constituted by a solid solution of an ionic compound in a polyepoxide, wherein said polyepoxide is the product of copolymerization of a monoepoxide of formula:

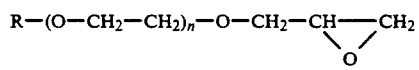

wherein:
R stands for methyl or ethyl radical; and
n is an integer comprised within the range of from 2 to 10;
with a diepoxide of formula:

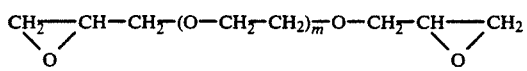

wherein:
is an integer comprised within the range of from 2 to 10;
with a molar ratio of monoepoxide to diepoxide comprised within the range of from 99.9/0.1 to 90/10;
with said polyepoxide furthermore having a weight average molecular weight equal to, or higher than, 1,000, and a glass transition temperature (Tg) of from $-80°$ to $-60°$ C.

Figure 1:
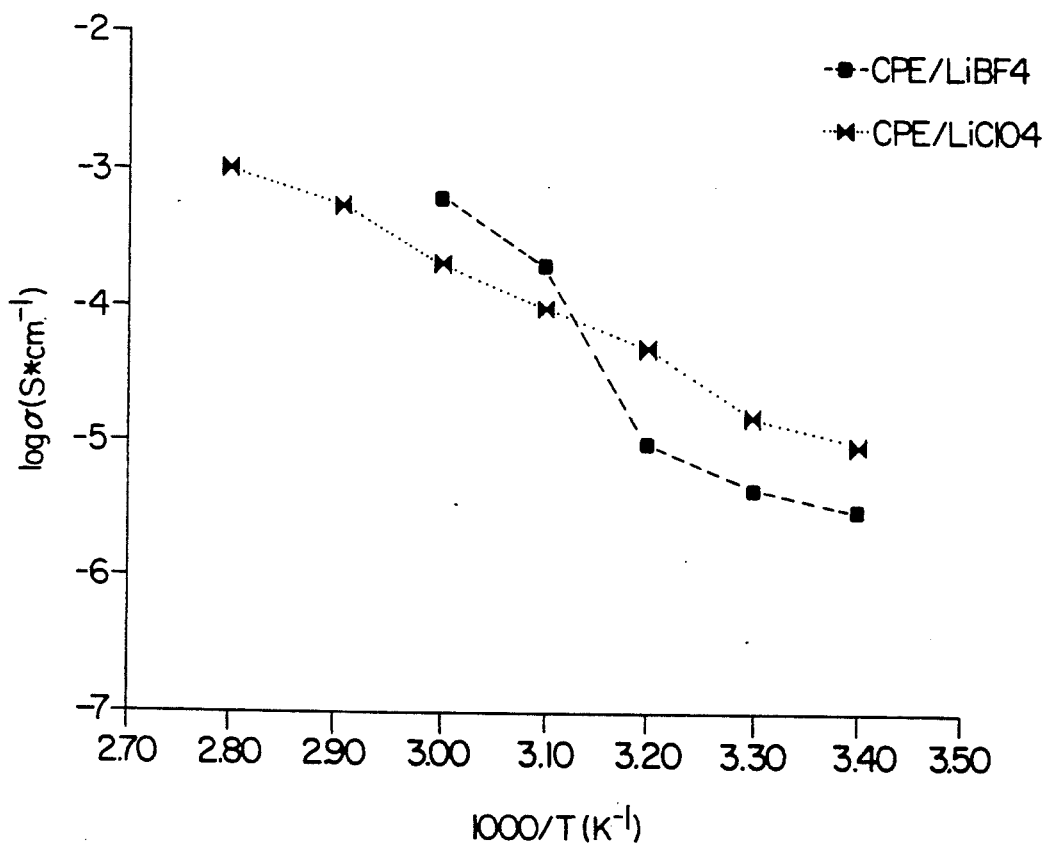
FIG. 1 describes the conductivity of membranes at various temperatures.

In the preferred form of practical embodiment, in the formulae which define the monoepoxide and the diepoxide, and n and m are integers comprised within the range of from 2 to 6. Furthermore, still according to the preferred form of practical embodiment, the copolymerization is carried out with a molar ratio of the monoepoxide to the diepoxide comprised within the range of from 98/2 to 90/10.

It should be observed that for the purposes of the present invention, the use of a polyepoxide obtained from a monoepoxide and a diepoxide, as above indicated, is an essential feature. In particular, the products of homopolymerization of said monoepoxide are not useful for the intended purpose, in that they do not display satisfactory mechanical characteristics.

DETAILED DESCRIPTION OF THE INVENTION

The monoepoxide useful as one of the comonomers for the production of the polyepoxide can be obtained by
reacting a suitable mono- or poly-ethyleneglycol monoalkylether with epichlorohydrin, in order to form the corresponding chlorohydrin and then treating said chlorohydrin with an inorganic base, in particular an alkali hydroxide, in order to form the monoepoxide.

The diepoxide can be obtained in a similar way by reacting diethyleneglycol, or the suitable polyethylene glycol with epichlorohydrin in order to obtain the corresponding dichlorohydrin, and then converting the latter into the diepoxide by means of the treatment with an inorganic base, in particular an alkali hydroxide.

The polyepoxide, according to the present invention, is advantageously prepared by copolymerizing the monoepoxide and the diepoxide in an organic solvent, in the presente of an anionic or ionic-coordinate catalyst. Examples of solvents suitable for the intended purpose are dimethylsulfoxide, in the event the polymerization is carried out by the anionic route, and benzene, toluene or ether solvents, such as dioxane and ethyl ether, in the event of a polymerization carried out by the ionic-coordinate route.

Examples of anionic catalysts suitable for the intended purpose are the metal alkoxides, in particular the alkali-metal alkoxides, such as, e.g., potassium tert.-butoxide. Examples of ionic-coordinate catalysts suitable for the intended use are trialkyl-aluminum compounds, such as, e.g., triethyl-aluminum and dialkyl-zinc compounds, such as, e.g., diethyl-zinc, which can also be used in combination with a co-catalyst, such as, e.g., water.

When it is carried out by the anionic route, the polymerization is usually carried out at a temperature comprised within the range of from 0° to 50° C., for times of the order of from 24 hours up to 1 week, and with an amount of metal alkoxide generally comprised within the range of from 0.5 to 2 mol per each 100 mol of epoxy monomers.

In the case of the ionic-coordinate polymerization, the polymerization temperatures are comprised within the range of from $-78°$ to $25°$ C., with a catalyst amount generally comprised within the range of from 1 to 5 mol per each 100 mol of epoxy monomers. The co-catalyst used is generally contained in the reaction mixture in amounts comprised within the range of from 0.5 to 2 mol per each mol of ionic catalyst.

At the end of the polymerization, the catalyst is deactivated, e.g., by means of the addition of small amounts of an alkyl iodide or of an alcohol, and the so obtained polyepoxide can be separated from the reaction mixture by means of the usual separation techniques, e.g., by extraction with an organic solvent, such as chloroform, followed by the removal of the solvent by evaporation. The physical form of the so obtained polyepoxide ranges from an oil to a material of rubber-like consistency, as a function of the molecular weight thereof.

The solid, polymeric electrolyte according to the present invention is constituted by a solid solution of an ionic compound in the polyepoxide having the above reported characteristics. Ionic compounds useful for the intended purpose are the salts, and, in particular, perchlorate, borate, fluoborate, thiocyanate, trifluoroacetate and trifluoromethanesulfonate salts of mono- or polyvalent metals selected from the group consisting of lithium, sodium, potassium, calcium, copper, zinc, magnesium, lead, tin and aluminum used in such an amount as to have an atomic ratio of the oxygen contained in the polyepoxide to the metal, comprised within the range of from about 2/1 to about 24/1. Lithium salts, and preferably lithium perchlorate and lithium fluoborate, with an atomic ratio of oxygen to lithium comprised within the range of from 6/1 to 18/1, are preferred.

In the preparation of the solid, polymeric electrolyte, one can proceed by independently dissolving the polyepoxide and the ionic compound in a suitable solvent, such as, e.g., acetonitrile. Said two solutions are then mixed with each other in order to obtain an end homogeneous solution, which is deposited on a suitable support (e.g., a polytetrafluoroethylene disk) as a liquid film, from which the solvent is evaporated off. At the end of the evaporation, advantageously carried out under an inert atmosphere, e.g., under an argon atmosphere, the solid, polymeric electrolyte is obtained as a membrane having a thickness which can generally be comprised within the range of from 50 to 200 microns. This membrane is completely amorphous, and generally shows a glass transition temperature (Tg) comprised within the range of from $0°$ to $-50°$ C., for O/Li ratios respectively comprised within the range of from 2/1 to 24/1.

The solid, polymeric electrolyte is endowed with mechanical strength, is dimensionally stable and is highly conductive, even at relatively low temperatures, with the conductivity thereof being of ionic type, in the absence, or substantial absence, of a conductivity of electronic type. The solid, polymeric electrolyte according to the present invention, in particular in membrane form, can be used as an electrolytic separator in such devices as the electrochemical generators. Other application sectors are optical displays, electrochromic systems and sensors.

The following experimental examples are reported for the purpose of better illustrating the present invention.

EXAMPLE 1

Preparation of the Monoepoxide (n=2)

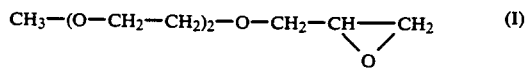

Diethyleneglycol monoalkylether (1 mol) and etherated boron trifluoride (BF$_3$.Et$_2$O; 2.5 mol) are charged to a three-necked flask of 250 ml of capacity, equipped with a condenser and kept under a nitrogen flow. Epichlorohydrin (0.25 mol) is added dropwise to the reaction flask during a dripping time of about 1.5 hours, by operating at the temperature of $80°$ C.; after addition is completed, the reaction mixture is kept at such a temperature for a further 15 hours. The reaction mixture is then cooled down to room temperature, is diluted with water and is repeatedly extracted with dichloromethane. The combined organic extracts are washed with a saturated solution of sodium chloride, are dried over sodium sulfate and the solvent is evaporated off down to a minimal volume of residue. Diethyleneglycol monoalkylether chlorohydrin and the excess of diethyleneglycol monoalkylether are recovered by distilling the residue under reduced pressure. In particular, 0.2 mol of said chlorohydrin is recovered, with a yield of 80% relatively to epichlorohydrin initially charged to the reaction flask. Diethyleneglycol monoalkylether chlorohydrin is identified by N.M.R. and I.R. spectroscopy and mass spectrometry.

The recovered chlorohydrin (0.2 mol) is diluted in ethyl ether (50 ml), the solution is cooled down to $5°$ C. and an aqueous solution at 50% by weight of sodium hydroxide (0.27 mol) is added to it during a 1-hour time. The epoxidation reaction is nearly complete 2.5 hours later than the end of the addition of sodium hydroxide. A heterogeneous reaction mixture is obtained, the temperature of which is allowed to increase up to room temperature, then the reaction mixture is filtered and the filtrate is dried over anhydrous sodium sulfate and is distilled. As a residue, a colourless liquid is obtained, which is confirmed to be the desired monoepoxide (I) by the analyses carried out by N.M.R. and I.R. spectroscopy, and mass spectrometry. The purity of monoepoxide (I) is higher than 98% and the yield thereof, as referred to the reacted diethyleneglycol monoalkylether used as the starting compound, is of about 80%.

EXAMPLE 2

Preparation of the Monoepoxide (n=5)

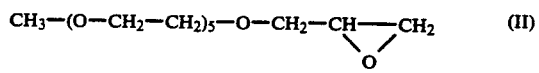

Tetraethyleneglycol (1 mol), dimethylsulfoxide (290 ml) as the solvent, and solid potassium hydroxide in powder form (0.33 mol) are charged, in the order shown, to a three-necked flask of 1,000 ml of capacity and equipped with a reflux condenser and kept under a nitrogen flow. After a time of about 1 hour, the reaction mixture is heated up to $80°$ C. and methoxyethyl chloride (0.40 mol) is then added dropwise to it, during a time of about 2 hours. The reaction is maintained at the temperature of $80°$ C. for a further 15 hours, then is cooled down to room temperature, is diluted with water and is extracted with chloroform. The combined organic extracts are washed with water until neutral, are dried over anhydrous sodium sulfate and are reduced to a minimal volume by evaporating off the solvent. Pentaethyleneglycol monomethylether is recovered by distillation under reduced pressure (41.6 g; 0.165 mol; yield 50%). The so obtained product is identified by N.M.R. and I.R. spectroscopy, and mass spectrometry.

The epoxide (II) is synthetized from the so obtained pentaethyleneglycol monomethyl ether, by following the same process as reported in Example 1.

EXAMPLE 3

Preparation of the Diepoxide (m=2)

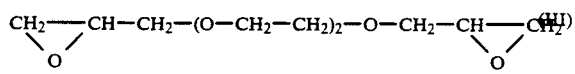

Diethyleneglycol (0.32 mol) and tin tetrachloride (0.73 mmol) are charged to a three-necked flask of 250 ml of capacity, equipped with a reflux condenser and kept under a nitrogen flow. The so obtained solution is heated up to 80°-90° C. and then epichlorohydrin (0.64 mol) is gradually added to it during a time of approximately 10-15 hours. At the end of the addition, the mixture is kept stirred at 80°-90° C. for a further 24 hours, then is cooled down to room temperature and is diluted with 65 ml of ethyl ether. To the ether solution of the so obtained dichlorohydrin, cooled to 0° C. by means of an ice bath, an aqueous solution at 50% by weight of sodium hydroxide (0.75 mol) is added. The reaction is complete within a time of 2-3 hours, and the obtained solution is eventually filtered, dried over anhydrous sodium sulfate and submitted to distillation.

In that way, 20 g of diepoxide (III) is obtained (equivalent to 0.13 mol; yield 40% as referred to the total amount of diethleneglycol used as the starting compound), the structure of which is confirmed by N.M.R. and I.R. spectroscopy and mass spectrometry.

EXAMPLE 4

Polymerization with Ionic Coordinate Catalyst

Toluene as the solvent (10 ml), water as the cocatalyst (1.25 mmol), monoepoxide (I) (34 mmol), diepoxide (II) (1.4 mmol) and finally a solution of diethylzinc catalyst (1.25 mmol) in toluene are charged in the order shown to a glass reactor of 50 ml of capacity, equipped with magnetic stirring means and inlet ways for the reactants and for the inert gas flow. The polymerization is carried out at room temperature (20°-25° C.) for a 30-hour time. During the course of the polymerization, a change in reaction mixture colour (turning from light yellow to dark yellow) is observed, with a simultaneous, gradual increase in the viscosity thereof taking place.

At the end of the polymerization the copolymer is extracted from the reaction mixture with chloroform and is recovered by evaporating off the solvent under reduced pressure. The polymerization yield is of about 80% and the recovered copolymer is a jelly-like mass of light colour. The copolymer is characterized by N.M.R. and I.R. spectroscopy and its glass transition temperature, as determined by D.S.C., is of −69° C.

EXAMPLE 5

Polymerization with Anionic Catalyst

Monoepoxide (II) (58 mmol) and diepoxide (III) (3.5 mmol) diluted in the polymerization solvent, consisting of anhydrous dimethylsulfoxide (10 ml) are charged to a glass reactor of 50 ml of capacity, equipped with a spiral stirrer and inlet ways for the reactants and the inert gas flow. Potassium tert.-butoxide catalyst (0.92 mmol) dissolved in 1 ml of dimethylsulfoxide is added to the reaction mixture, with the latter being kept with strong stirring. The polymerization is carried out at room temperature (20°-25° C.) for a 48-hour time and is eventually discontinued by means of the addition of methyl iodide (16 mmol). The copolymer is extracted from the reaction mixture with chloroform, and is recovered by evaporating the solvent. The copolymer, obtained with an approximately quantitative yield, is a viscous and transparent oil, having a glass transition temperature of −73° C. (as determined by D.S.C.) and a weight average molecular weight of 20,000 (as determined by osmometry, by using polyethylene glycols having a known molecular weight, and toluene as the reference solvent).

EXAMPLE 6

Preparation of the Electrolytic Membrane

The electrolytic membrane is prepared by independently dissolving the copolymer and a salt in acetonitrile, such as to form two homogeneous mixtures. Said two mixtures are then mixed with each other and the resulting mixture is homogenized by operating at 25° C. The resulting solution is deposited on Teflon disks as a film of 4 mm of thickness. The solvent is then slowly evaporated off within a time of 4-5 hours, by operating in an oven and under reduced pressure, with the film being dried under an argon atmosphere (containing less than 10 ppm of moisture) and an electrolytic membrane being recovered, which has a thickness of approximately 100 microns.

The measurement of the conductivity of the membrane is carried out in a cell equipped with two symmetrical platinum electrodes between which said membrane is housed.

In particular, a first electrolytic membrane is prepared by using the copolymer of Example 5 and lithium fluoborate ($LiBF_4$), in such amounts as to have an atomic ratio of oxygen (in the copolymer) to lithium (in the salt) of 8/1. The conductivity of this membrane at various temperatures is reported in the chart of FIG. 1 of the hereto attached drawing table (— — line).

A second electrolytic membrane is prepared from the copolymer of Example 5 and lithium perchlorate ($LiClO_4$), with the atomic ratio of O/Li being still equal to 8/1. The conductivity of this membrane at various temperatures is reported in the chart of FIG. 1 (— — line).

Both said first and second electrolytic membranes are amorphous and both of them show a glass transition temperature of about −20° C. (as determined by D.S.C.).

Figure 2:
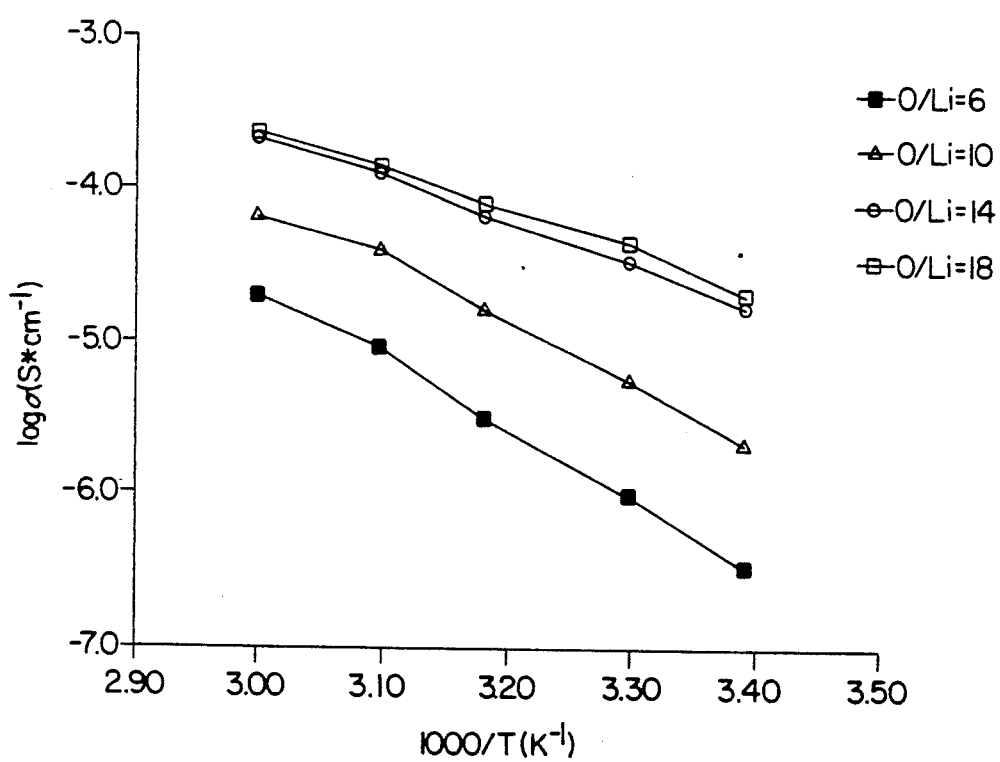
FIG. 2 describes the conductivity of membranes at varying ratios of oxygen to lithium.

Furthermore, still other electrolytic membranes were prepared by varying the ratio of O/Li within the range of from 6/1 to 18/1, using $LiClO_4$ as the complexing agent and an epoxy copolymer obtained from a monoepoxide with n=2 and a diepoxide with m=2. The conductivity of such membranes is reported in the chart of FIG. 2.

We claim:

1. Solid, polymeric electrolyte constituted by a solid solution of an ionic compound in a polyepoxide, wherein said polyepoxide is the product of copolymerization of a monoepoxide of formula:

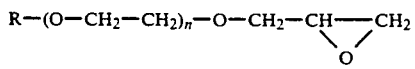

wherein:

R stands for methyl or ethyl radical; and n is an integer comprised within the range of from 2 to 10;

with a diepoxide of formula:

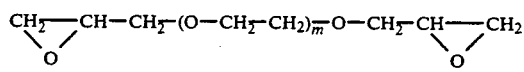

wherein:

is an integer comprised within the range of from 2 to 10;

with a molar ratio of monoepoxide to diepoxide comprised within the range of from 99.9/0.1 to 90/10;

with said polyepoxide furthermore having a weight average molecular weight equal to, or higher than, 1,000, and a glass transition temperature (Tg) of from −80° to −60° C.

2. Solid, polymeric electrolyte according to claim 1, characterized in that in the formulae which define the monoepoxide and the diepoxide, n and m are integers comprised within the range of from 2 to 6.

3. Solid, polymeric electrolyte according to claim 1, characterized in that the copolymerization is carried out with a molar ratio of the monoepoxide to the diepoxide comprised within the range of from 98/2 to 90/10.

4. Solid, polymeric electrolyte according to claim 1, characterized in that it contains an ionic compound selected from among perchlorate, borate, fluoborate, thiocyanate, trifluoroacetate and trifluoromethanesulfonate salts of mono- or polyvalent metals selected from the group consisting of lithium, sodium, potassium, calcium, copper, zinc, magnesium, lead, tin and aluminum used in such an amount as to have an atomic ratio of the oxygen contained in the polyepoxide to the metal, which is comprised within the range of from about 2/1 to about 24/1.

5. Solid, polymeric electrolyte according to claim 4, characterized in that it contains a lithium salt, with an atomic ratio of oxygen in the copolymer to lithium comprised within the range of from 6/1 to 18/1.

6. Solid, polymeric electrolyte according to claim 1, characterized in that it is in the form of a membrane of from 50 to 200 microns of thickness.

7. Solid, polymeric electrolyte according to claim 1, wherein the monoepoxide is the reaction product of a mono- or poly-ethyleneglycol monoalkylether with epichlorohydrin to form chlorohydrin, and then treating said chlorohydrin with an inorganic base to form the monoepoxide.

8. Solid, polymeric electrolyte according to claim 1, wherein the diepoxide is the reaction product of a polyethylene glycol with epichlorohydrin to form dichlorohydrin and, then treating said dichlorohydrogen with an inorganic base to form the diepoxide.

9. Solid, polymeric electrolyte according to claim 9, wherein the polyethylene glycol is diethylene glycol.

10. Solid, polymeric electrolyte according to claim 2, wherein n is equal to 2.

11. Solid, polymeric electrolyte according to claim 2, wherein n is equal to 5.

12. Solid, polymeric electrolyte according to claim 2, wherein m is equal to 2.

13. Solid, polymeric electrolyte according to calim 5, wherein the lithium salt is selected from lithium perchlorate and lithium fluoborate.

14. Solid, polymeric electrolyte according to claim 6, wherein the membrane has a glass transition temperature (Tg) within the range of from 0° to −50° C.

15. Solid, polymeric electrolyte according to claim 6, wherein the membrane has a thickness of about 100 microns.

16. Solid, polymeric electrolyte according to claim 6, wherein the ionic compound is lithium fluoborate, the atomic ratio of oxygen in the copolymer to lithium is about 8/1 and the membrane has a glass transition temperature of about −20° C.

17. Solid, polymeric electrolyte according to claim 6, wherein the ionic compound is lithium perchlorate, the atomic ratio of oxygen in the copolymer to lithium in the salt is about 8/1 and the membrane has a glass transition temperature of about −20° C.

* * * * *